United States Patent
Steenbakkers-Menting et al.

(10) Patent No.: US 10,626,604 B2
(45) Date of Patent: Apr. 21, 2020

(54) ROOF FORMING ELEMENT FOR A ROOF OF A BUILDING, AND ROOF

(71) Applicant: SABIC GLOBAL TECHNOLOGIES B.V., Bergen op Zoom (NL)

(72) Inventors: Henrica Norberta Alberta Maria Steenbakkers-Menting, Susteren (NL); Roland van Giesen, Geleen (NL); Marinus van den Berg, Geleen (NL)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 0 days.

(21) Appl. No.: 15/756,175

(22) PCT Filed: Sep. 2, 2016

(86) PCT No.: PCT/EP2016/070684
§ 371 (c)(1),
(2) Date: Feb. 28, 2018

(87) PCT Pub. No.: WO2017/037214
PCT Pub. Date: Mar. 9, 2017

(65) Prior Publication Data
US 2018/0245343 A1  Aug. 30, 2018

(30) Foreign Application Priority Data
Sep. 2, 2015 (EP) .................................... 15183470

(51) Int. Cl.
*E04B 7/22* (2006.01)
*E04B 7/12* (2006.01)
(Continued)

(52) U.S. Cl.
CPC .................. *E04B 7/22* (2013.01); *E04B 7/12* (2013.01); *E04D 3/351* (2013.01); *E04D 3/357* (2013.01);
(Continued)

(58) Field of Classification Search
CPC .... E04D 3/28; E04D 3/24; E04D 3/32; E04D 3/357; E04D 2003/3617; E04D 3/362;
(Continued)

(56) References Cited

U.S. PATENT DOCUMENTS 4,095,383 A    6/1978 Strobl
4,580,373 A *  4/1986 Bastiansen ................ E04D 3/28
                                                    52/94
(Continued)

FOREIGN PATENT DOCUMENTS

DE    1931322 U    12/1970
DE    4416027 A1   11/1995
(Continued)

OTHER PUBLICATIONS

International Search Report for International Application No. PCT/EP2016/070684; International Filing Date: Sep. 2, 2016; dated Nov. 22, 2016; 3 Pages.

(Continued)

*Primary Examiner* — Ryan D Kwiecinski
*Assistant Examiner* — Matthew J Gitlin
(74) *Attorney, Agent, or Firm* — Cantor Colburn LLP

(57) ABSTRACT

The invention relates to a roof forming element for a roof, comprising a roof plate, a beam integral with the roof plate, such that the integral combination of the roof plate and the beam has an L-shaped cross-section, a cover, and coupling means for coupling the roof forming element to a further, neighbouring element. The roof forming element, at least in a mounted condition of a plurality of such elements, is configured such that the second longitudinal side of the element is arranged to be supported by the first longitudinal side of a further, neighbouring one of said elements, so that the beam of the further roof forming element also supports the roof plate of the roof forming element, and so that the (Continued)

Figure 10A:
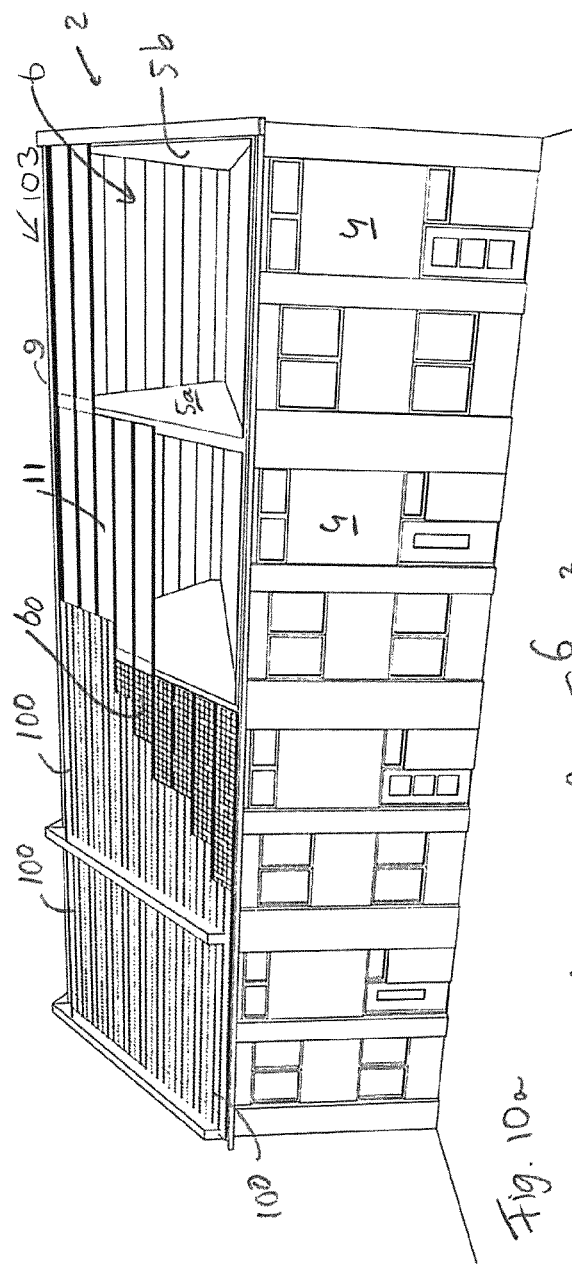

respective roof plate elements of said roof forming element and further roof forming element are flush with respect to each other.

17 Claims, 5 Drawing Sheets

(51) Int. Cl.
*E04D 3/35* (2006.01)
*H02S 20/25* (2014.01)
*H02S 20/23* (2014.01)
*F24S 20/69* (2018.01)
*E04D 3/28* (2006.01)
*E04D 1/34* (2006.01)

(52) U.S. Cl.
CPC .............. *F24S 20/69* (2018.05); *H02S 20/23* (2014.12); *H02S 20/25* (2014.12); *E04D 2001/3447* (2013.01); *E04D 2003/285* (2013.01); *Y02B 10/12* (2013.01)

(58) Field of Classification Search
CPC ....... E04D 2003/285; E04C 2/20; E04C 2/54; E04C 2/543; E04C 3/28; F24F 20/69
See application file for complete search history.

(56) References Cited

U.S. PATENT DOCUMENTS

| | | | | |
|---|---|---|---|---|
| 4,930,282 A * | 6/1990 | Meadows | ................. | E04D 1/20 52/551 |
| 5,177,924 A * | 1/1993 | Kakuk | ...................... | E04C 2/16 52/606 |
| 5,411,782 A * | 5/1995 | Jarvis | ........................ | E04H 4/08 160/229.1 |
| 5,613,339 A * | 3/1997 | Pollock | ..................... | B63B 3/48 114/263 |
| 5,636,481 A * | 6/1997 | De Zen | ................... | E04B 7/205 52/522 |
| 5,758,456 A * | 6/1998 | Case | ......................... | E04C 2/20 52/177 |
| 5,768,831 A * | 6/1998 | Melchior | .............. | H01L 31/048 52/173.3 |
| 6,023,922 A | 2/2000 | Lancaster | | |
| 8,065,841 B2 | 11/2011 | Antonic | | |
| 8,945,699 B2 * | 2/2015 | Thiagarajan | .............. | E04C 2/20 428/119 |
| 2011/0252724 A1* | 10/2011 | Heisler | ................... | E04B 7/022 52/173.3 |
| 2012/0011798 A1* | 1/2012 | Rivellino | ................. | E04B 1/12 52/655.1 |
| 2012/0186633 A1* | 7/2012 | Carolan | .................. | E04D 3/352 136/251 |
| 2013/0118545 A1* | 5/2013 | Bosler | ................... | E04D 3/3605 136/244 |
| 2013/0283710 A1* | 10/2013 | Laurin | ...................... | E04B 1/61 52/173.3 |

FOREIGN PATENT DOCUMENTS

| | | |
|---|---|---|
| EP | 0050462 A1 | 4/1982 |
| FR | 1581692 A | 9/1969 |
| GB | 2402959 A | 12/2004 |
| WO | 2005108707 A3 | 11/2005 |

OTHER PUBLICATIONS

Machine Translation of DE1931322(U); Date of Publication: Dec. 23, 1970; 4 Pages.
Written Opinion of the International Searching Authority for International Application No. PCT/EP2016/070684; International Filing Date: Sep. 2, 2016; dated Nov. 22, 2016; 6 Pages.
Machine Translation of DE4416027; Date of Publication: Nov. 9, 1995; 10 Pages.
Machine Translation of FR1581692; Date of Publication: Sep. 19, 1969; 4 Pages.

\* cited by examiner

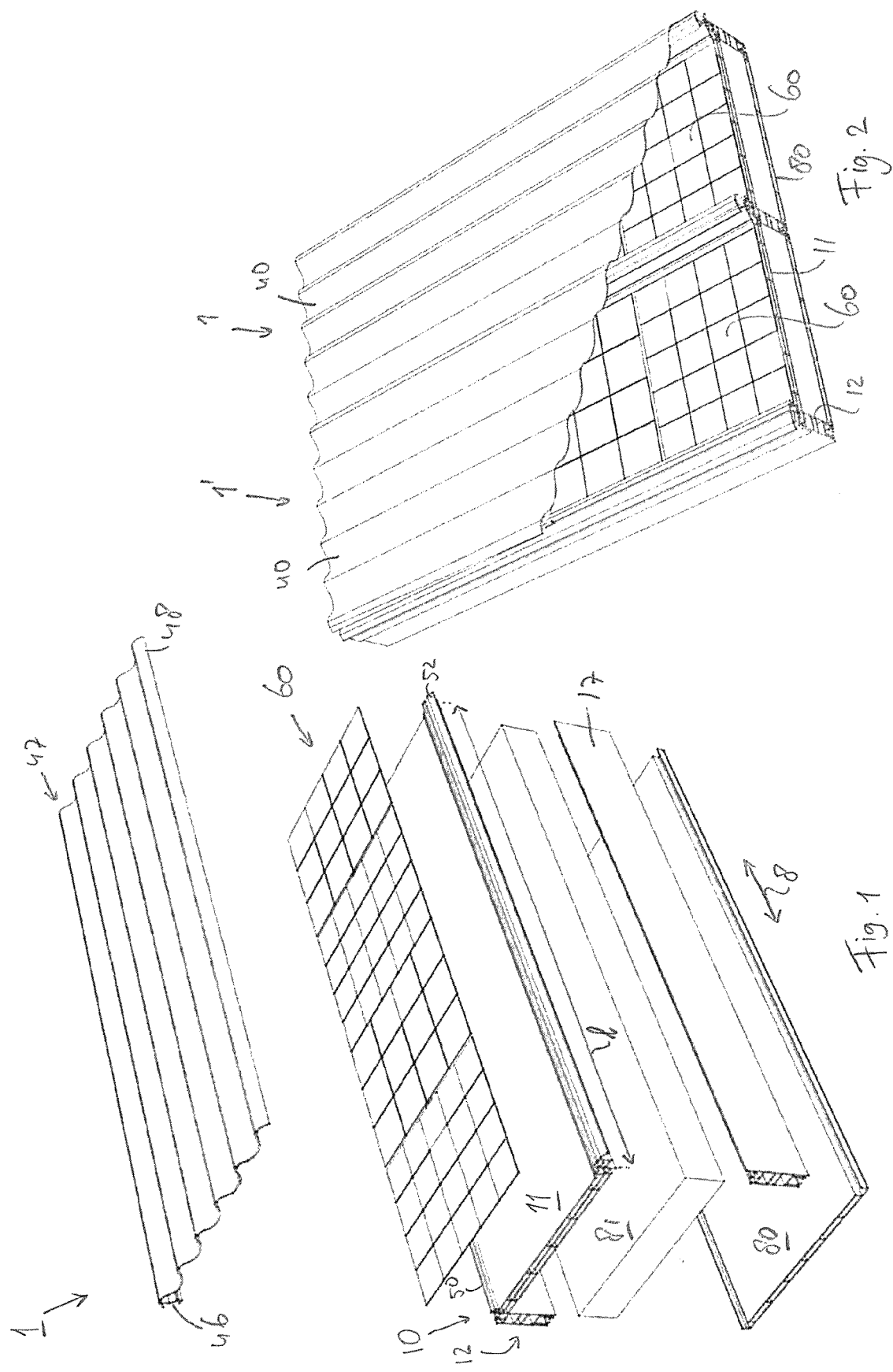

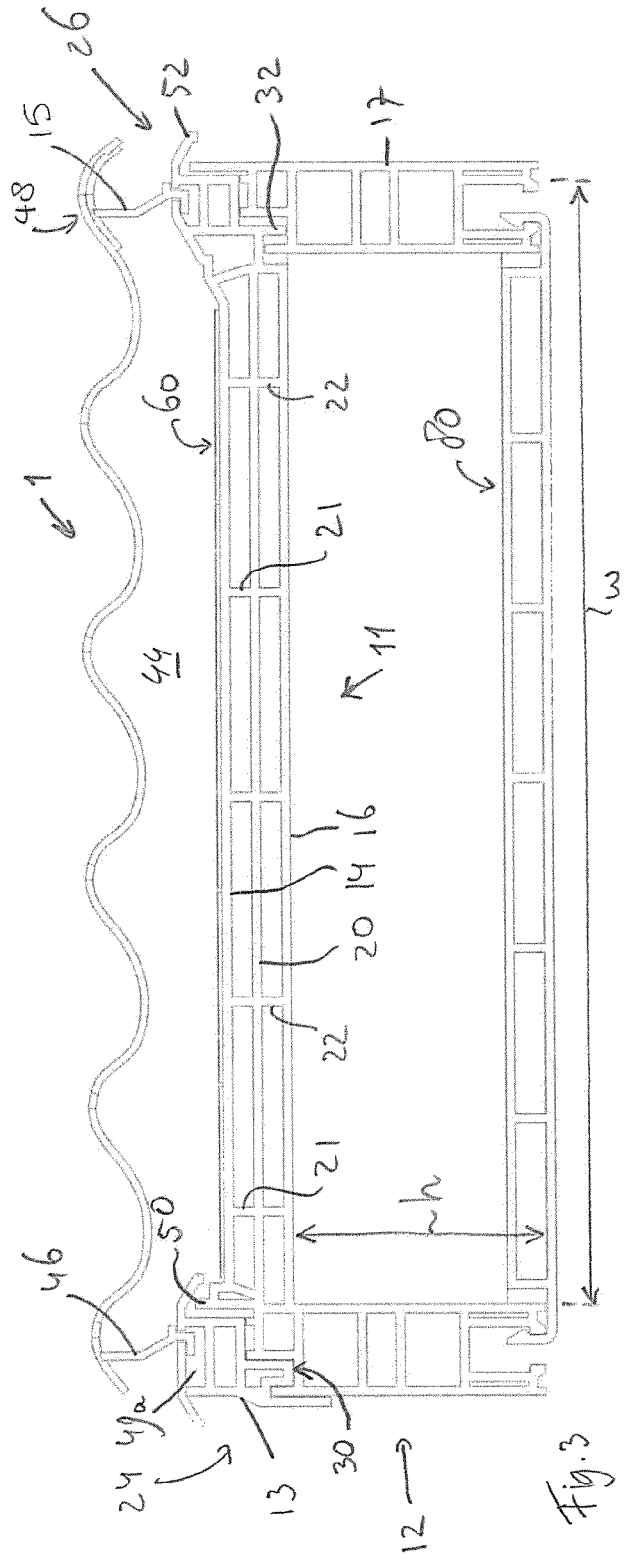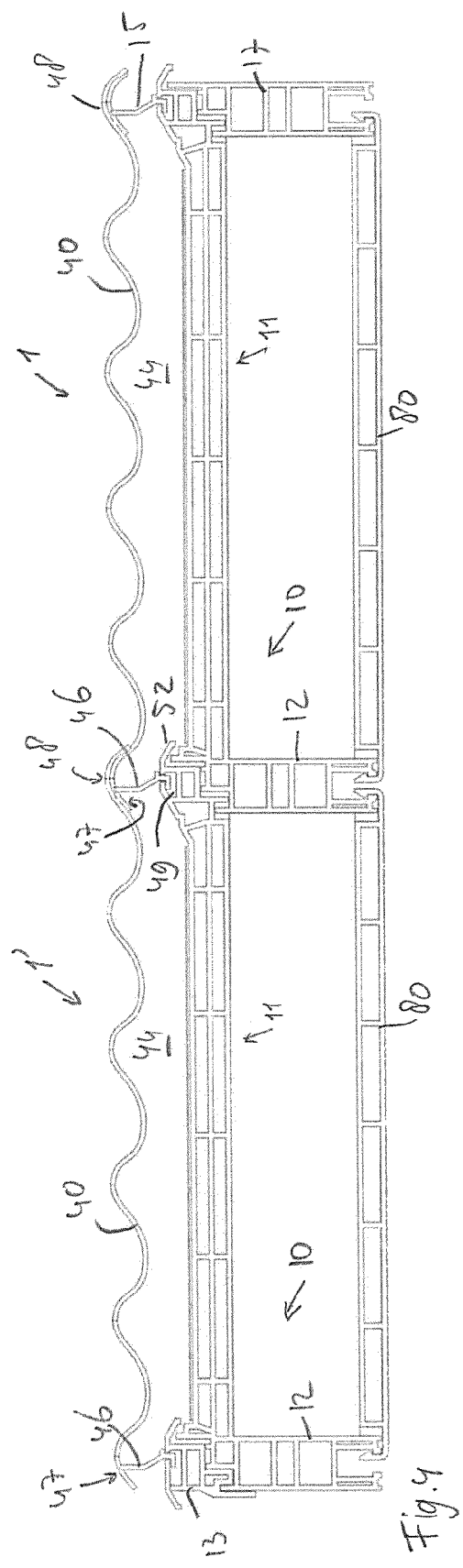

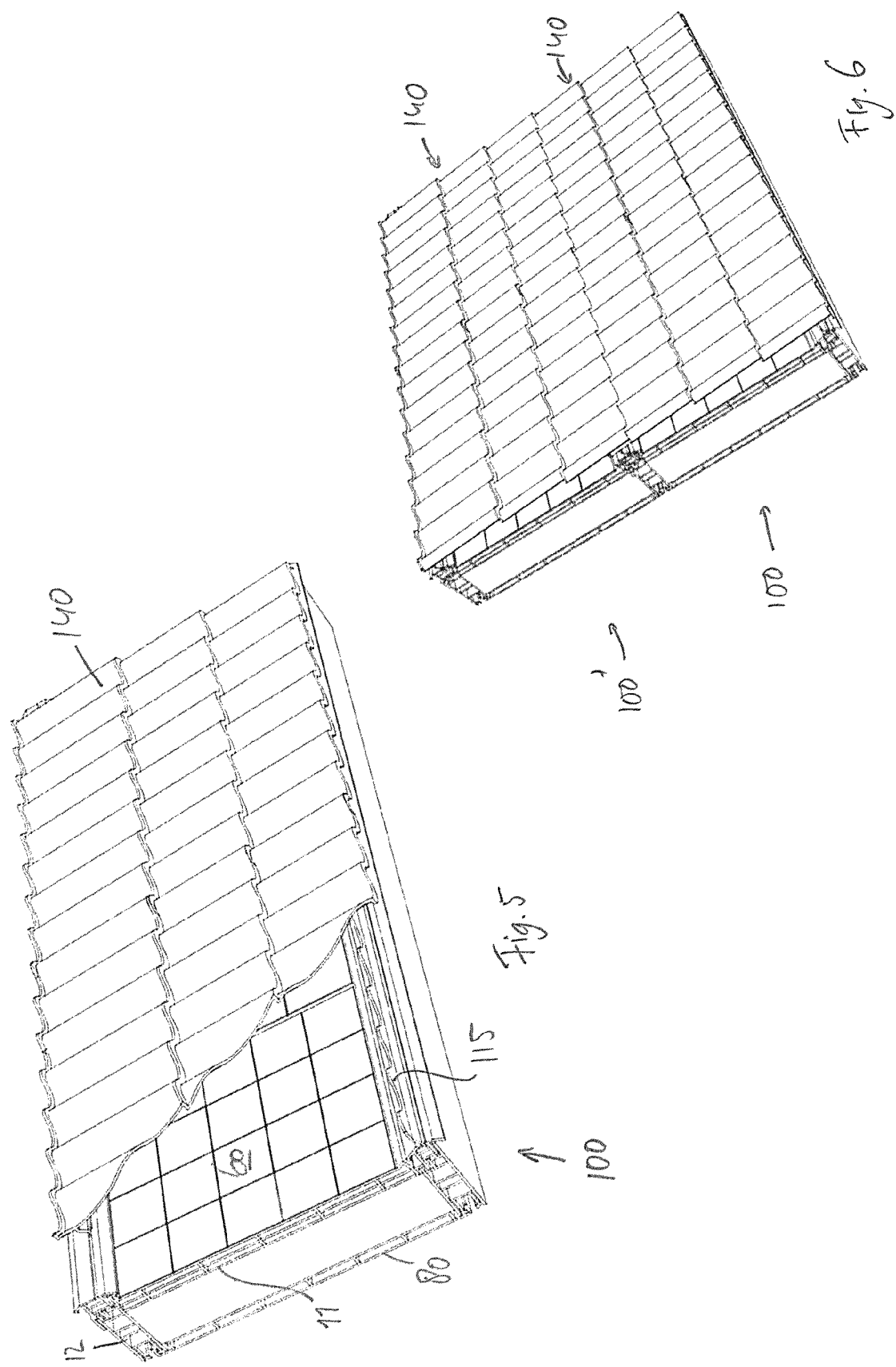

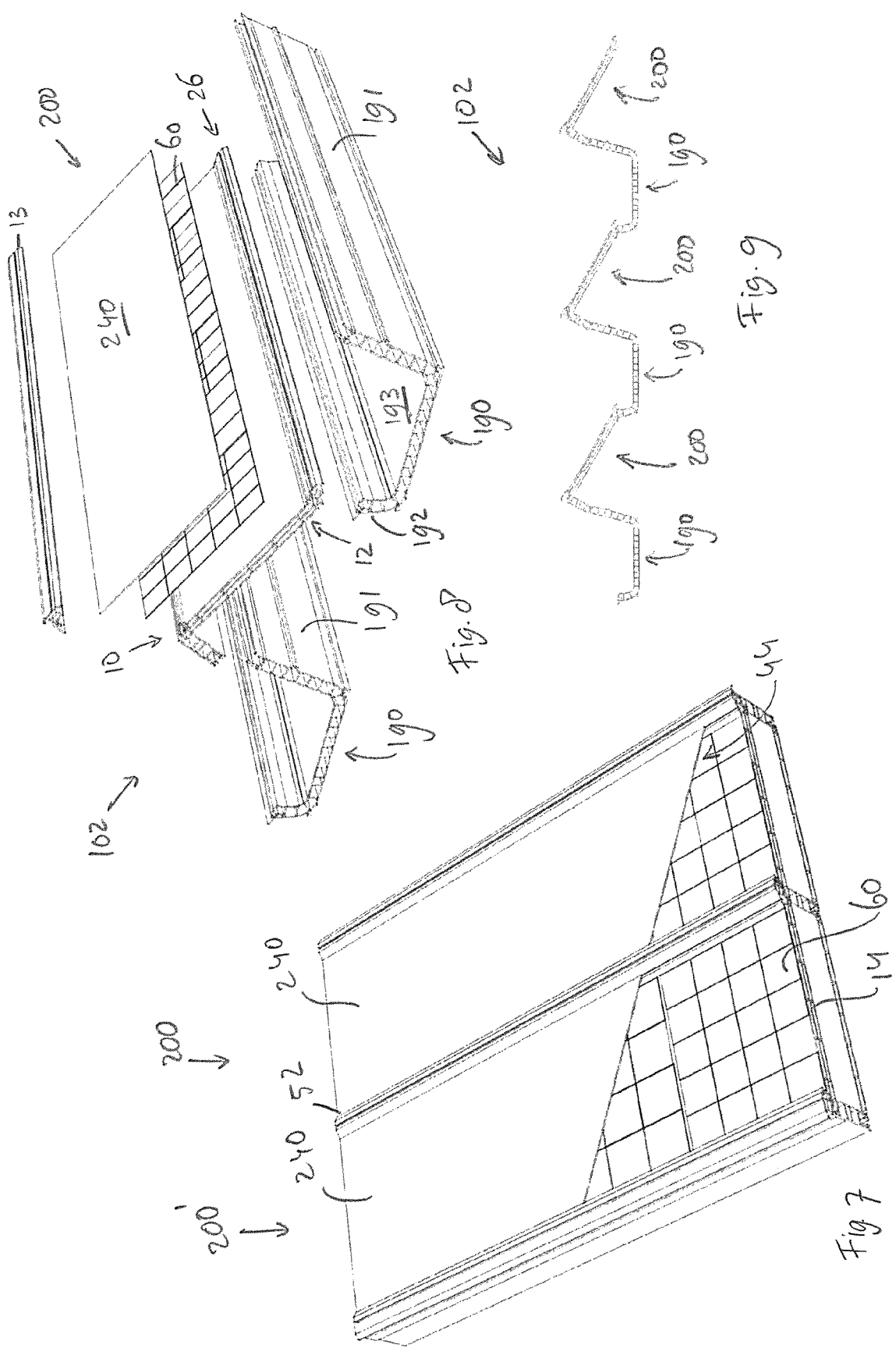

ROOF FORMING ELEMENT FOR A ROOF OF A BUILDING, AND ROOF

CROSS REFERENCE TO RELATED APPLICATIONS

This application is a 371 of International Application No. PCT/EP2016/070684, filed Sep. 2, 2016, which claims priority to European Application No. 15183470.2 filed Sep. 2, 2015 which are incorporated herein by reference in their entirety.

The invention relates to a roof forming element for a roof of a building, and to a roof of a building, at least partly formed by a plurality of such roof forming elements.

WO 2008/082600 A1 relates to roof panel systems for use in building constructions.

An object of the present invention is to provide a lightweight, cost efficient and versatile roof forming element.

Said object is achieved by the roof forming element according to the present invention, for a roof of a building, as defined in claim 1.

The roof forming element for a roof of a building, which roof closes an opening of the building, wherein the roof is at least partly formed by a plurality of such roof forming elements which each close a part of said opening, comprises
an elongate, preferably extruded, polymer roof plate having a top plate and a bottom plate parallel to the top plate, which top and bottom plate are integrally interconnected via a plurality of ribs extending in a length direction, i.e. extrusion direction of the roof plate,
a beam which is manufactured, preferably extruded, as one integral part together with the roof plate, wherein the beam extends in the length direction of the roof plate, is located at a first longitudinal side of the roof plate, and protrudes downwards from the bottom plate of the roof plate, wherein the other, second longitudinal side is free from such a beam protruding downwards from the bottom plate, so that the integral combination of the roof plate and the beam has an L-shaped cross-section,
a cover for at least substantially completely covering the top plate at a distance therefrom, so as to define an interior space between the cover and the top plate, wherein the cover comprises at least one cover element which extends over the entire width of the roof plate and over at least part of the length of the roof plate, and
coupling means for coupling the roof forming element to a further, neighbouring roof forming element of said plurality of roof forming elements.

The roof forming element, at least in a mounted condition of a plurality of such roof forming elements forming the roof, is configured such that the second longitudinal side of the roof forming element is arranged to be supported by the first longitudinal side of a further, neighbouring one of said plurality of roof forming elements, so that the beam of the further roof forming element also supports the roof plate of the roof forming element, and so that the respective roof plate elements of said roof forming element and further roof forming element are flush with respect to each other. Thus, the first longitudinal side of the roof forming element is configured such that a second longitudinal side of a still further roof forming element of the plurality of roof forming elements is supported by the first longitudinal side, so that the beam of the roof forming element also supports the roof plate of the still further roof forming element, and so that the respective roof plate elements of the roof forming element and the still further roof forming element are flush with respect to each other.

An advantage of the roof forming element according to the present invention, is that because of the L-shape thereof, a roof can be formed in a very efficient manner using a plurality of such elements. The beam of a first one of said elements also supports a second one of said elements, at least in case of directly adjacent elements. The integral combination of the beam and the roof plate provides bending and torsion stiffness to the elements. As a result, the elements may extend over the entire building opening covered by the roof, i.e. they may have a substantial length. Thus, a roof forming element according to the invention provides in one and the same element a building closure as well as a constructional provision. The elements according to the invention are highly cost-efficient since the main components, being the roof plate and the beam, are manufactured as an integral component, and are preferably extruded. The elements are also highly versatile. Dependent on requirements they may be provided with for example a photovoltaic element within the interior space thereof. The cover may be configured such that an aesthetically pleasing outer view is achieved, for example resembling the shape of tiles or having a desired colour. Due to the use of a polymer for the integral combination of the roof plate and the beam, and highly preferably also for the cover, the roof forming element can be manufactured very cost efficient. The cover may in an embodiment also be extruded or be extruded in combination with vacuum forming. Alternatively it may be moulded, preferably injection moulded. Using a plurality of roof forming elements according to the invention, a roof can be easily and quickly formed.

The roof plate may in an embodiment be moulded such as preferably injection moulded.

Preferably, the ratio between the height of the beam and the width of roof plate element is in the range of 1:15 to 1:3, preferably 1:10 to 1:4, more preferably 1:7 to 1:5. In an embodiment, the width of the roof plate is in the range of 30 to 150 cm., preferably in the range of 45 to 75 cm. The height of the beam is preferably in the range of 2 to 30 cm.

Preferably the coupling means are configured for a coupling, preferably a form-closed coupling, of the second longitudinal side of the roof forming element to a first longitudinal side of the further, neighbouring one of the plurality of roof forming elements. This way, a roof can efficiently be formed using a plurality of mutually coupled roof forming elements. Preferably, the coupling means are constituted by one of a rib and a groove on the first longitudinal side, and another of the rib and the groove on the second longitudinal side, which rib is arranged to fall in a groove of a neighbouring roof forming element. The rib and groove may be designed such that they have a mutual play in width direction of the roof plate. The play may for example be in the range of 1 to 50 mm., preferably in the range of 1 to 20 mm., more preferably in the range of 5 to 15 mm. This allows for some adjustment in the width direction, such that the total width of a plurality of mutually coupled roof forming elements may be adjusted to a the width of the building opening.

It is advantageous if the roof plate has a rib at the first longitudinal side of the roof plate, on top of the top plate of the roof plate, and has a flange element at the second longitudinal side of the roof plate, which is arranged to overlap a rib of the further, neighbouring roof forming element connected to the roof forming element. As a result, precipitation cannot pass through the juncture between the roof forming element and the neighbouring roof forming element. Also, the juncture can be made wind-proof. In an embodiment, additional sealing elements may be provided, such as further ribs in combination with grooves, and/or a labyrinth like seal.

In an advantageous embodiment, the roof plate comprises an intermediate plate between, and parallel to, the top plate and the bottom plate, wherein the intermediate plate is integrally interconnected to the top plate as well as to the bottom plate via a plurality of ribs extending in length direction of the roof plate. As a result, a row of channels is present in width direction of the roof plate (as a result of the manufacturing by extrusion) within the roof plate on the upper side of the intermediate plate as well as on the bottom side of the intermediate plate. One of the rows of channels, preferably the row between the top plate and intermediate plate may be used to allow for an air flow through said channels, either naturally in particular in case of a pitched roof, or forced, so as to provide for air cooling. The other row, preferably the row may be filled with an insulating material, preferably a foam, more preferably a PUR foam or a polyolefin foam such as a PP or PE foam. Highly preferably the insulating material is flame-retardant, i.e. self-extinguishing. In an embodiment, one of the rows of channels, preferably the row between the top plate and intermediate plate may be closed at the outer ends so that a volume of air is trapped inside the roof plate, thus increasing the insulating properties. The other row may in that case be filled with a mentioned insulating material.

In a preferred embodiment the cover seals the interior space from external influences, such as in particular precipitation, at the longitudinal sides of the roof forming element, wherein the roof forming element comprises a respective closing element at both its end faces seen in the length direction, extending between the roof plate and the cover, for sealing the interior space of the roof forming element at the respective end face. As a result, the interior space is completely sealed and can effectively be used to accommodate a photovoltaic element, for example.

Preferably the integral combination of the roof plate and the beam is at least substantially made of a polymer, wherein preferably the polymer is a polyolefin, preferably polypropylene or polyethylene, wherein further preferably the polymer is a reinforced polymer, preferably a glass fibre reinforced polymer, preferably glass fibre reinforced polypropylene. In an embodiment said integral combination is made of PP or PE or PC or PPO. In an embodiment, said integral combination of the roof plate and the beam is made of PC-sgf or PP-sgf, optionally comprising flame retarders, and optionally reinforced such as with glass fibres.

In particular with regard to use of the modular element for covering a roof, it is advantageous if the polymer is fire retardant, preferably halogen-free flame retardant. In view of use of the element in combination with a photovoltaic element, the reinforced polymer is preferably heat resistant.

In a highly preferred embodiment the roof forming element comprises a photovoltaic element in its interior space, wherein the cover is light transparent to such an extent that in use electrical power can be generated by the photovoltaic element due to incident sunlight.

Preferably the transmission, for sunlight, of the cover is at least 50 percent.

In an embodiment, the photovoltaic element is formed by a solar module, i.e. a packaged, connected assembly of solar cells being fully covered with an encapsulation layer.

In another embodiment the photovoltaic element is a foil placed inside the container.

In an embodiment the photovoltaic cell is exchangeably disposed in the interior of the container.

In a preferred embodiment the cover is colored. When a commonly used color for roof tiles is chosen, the similarity of a roof formed by a plurality of elements according to the invention, and a common roof covered with roof tiles, is very high.

Preferably the cover is connected to the roof plate in a releasable manner. The releasable connection may comprise a snap/lock connection and/or a screw connection. As a result, in use for example the photovoltaic element can be removed from or placed in the interior space, without having to exchange the combination of the roof plate and the beam.

In a preferred embodiment, the cover has, on its outer, upper, side, the shape and color of a pattern of roof tiles, such as Spanish roof tiles, flat roof tiles, or shingles. Preferably, the cover is designed such as to simulate a plurality of adjacent roof tiles, in two directions of the roof. Alternatively the cover is corrugated or flat.

The invention also relates to a roof of a building, the roof closing an opening of the building, wherein the roof is at least partly formed by a plurality of roof forming elements according to the invention, which each close a part of said opening, wherein the plurality of roof forming elements is supported by a support structure of the building, which support structure surrounds the opening.

Advantages of the roof according to the invention are analogous to the above mentioned advantages of the roof forming element according to the invention.

Preferably, the roof is designed such that in use the second longitudinal side of a first one of said plurality of roof forming elements is supported by the first longitudinal side of a second, neighbouring one of said plurality of roof forming elements, so that the beam of the second roof forming element also supports the roof plate of said first roof forming element, and wherein the respective roof plate elements of said first and second roof forming elements are flush with respect to each other. This way, a roof can efficiently be formed using a plurality of mutually coupled roof forming elements, wherein optimal use is made of the beams.

Preferably, the roof comprises a plurality of ceiling plates, wherein each of the ceiling plates is connected to a free end of the beam of at least two neighbouring roof forming elements, so as to form a ceiling for an interior space of the building underneath the roof. Using such ceiling plates the remainder of the roof is effectively concealed from view. Preferably, the ceiling plates are connected to the beams using a snap/lock connection. Preferably, an insulating material, preferably of a type mentioned above, that means, a flame-retardant polymer, is provided between the bottom plates of the roof plates and the ceiling plates. The insulating material may also comprise a gypsum board.

In a preferred embodiment, each of the plurality of roof forming elements has a length which is about equal to a length of the roof and a width which is a part of a width of the roof, wherein the plurality of roof forming elements are interconnected such that they close the entire opening in the building. In an embodiment, several roof forming elements may be placed successively in length direction, in case of a relatively large roof span in length direction. The building may in that case comprise additional girders to support each of the roof forming elements.

In another preferred embodiment, each of the plurality of roof forming elements has a length which is about equal to a length of the roof and each have a width which is a part of a width of the roof, wherein the plurality of roof forming elements are interconnected, wherein the roof also comprises a further roof forming element having the roof plate and the cover but is free from a beam at its first longitudinal side, which further roof forming element is interconnected to one of the outer ones of the interconnected roof forming elements at the first longitudinal side of that outer roof forming element, wherein the opening is closed entirely by the further roof forming element and the plurality of roof forming elements. This way, the height of the walls defining the width of the opening may be equal.

In a highly preferred embodiment, the roof is a pitched roof, wherein the opening closed by the roof is bounded by a ridge and a building wall, which define the length of the roof, and by further opposite building walls, which define a width of the roof. Preferably the plurality of roof forming elements extend in length direction of the roof.

Preferably, the roof comprises in the interior space of at least one of the plurality of roof forming elements a photovoltaic element as mentioned above, wherein the cover of that at least one roof forming element is light transparent to such an extent that in use electrical power can be generated by the photovoltaic element due to incident sunlight.

The present invention will now be explained in more detail by a description of preferred embodiments of a roof forming element and of a roof according to the present invention, with reference to the enclosed schematic figures, in which:

FIG. 1 shows in three-dimensional, exploded view a first embodiment of a roof forming element according to the invention, FIG. 2 shows in three-dimensional view a part of two roof forming elements according to FIG. 1, in interconnected condition, FIG. 3 shows a front view of the roof forming elements according to FIG. 1, FIG. 4 shows a front view of the two roof forming elements in interconnected condition according to FIG. 2, FIG. 5 shows in three-dimensional view a part of a second embodiment of a roof forming element according to the invention, FIG. 6 shows in three-dimensional view a part of two roof forming elements according to FIG. 5, in interconnected condition, FIG. 7 shows in three-dimensional view a part of two roof forming elements according to a third embodiment of the invention, in interconnected condition, FIG. 8 shows in three-dimensional, exploded view a part of a first embodiment of a roof according to the invention, comprising roof forming elements according to the third embodiment as shown in FIG. 7, FIG. 9 shows a cross section of a part of the first embodiment of the roof according to the invention, FIG. 10a shows in three-dimensional view a second embodiment of a roof according to the invention, comprising roof forming elements according to the second embodiment, and.

Figure 10B:
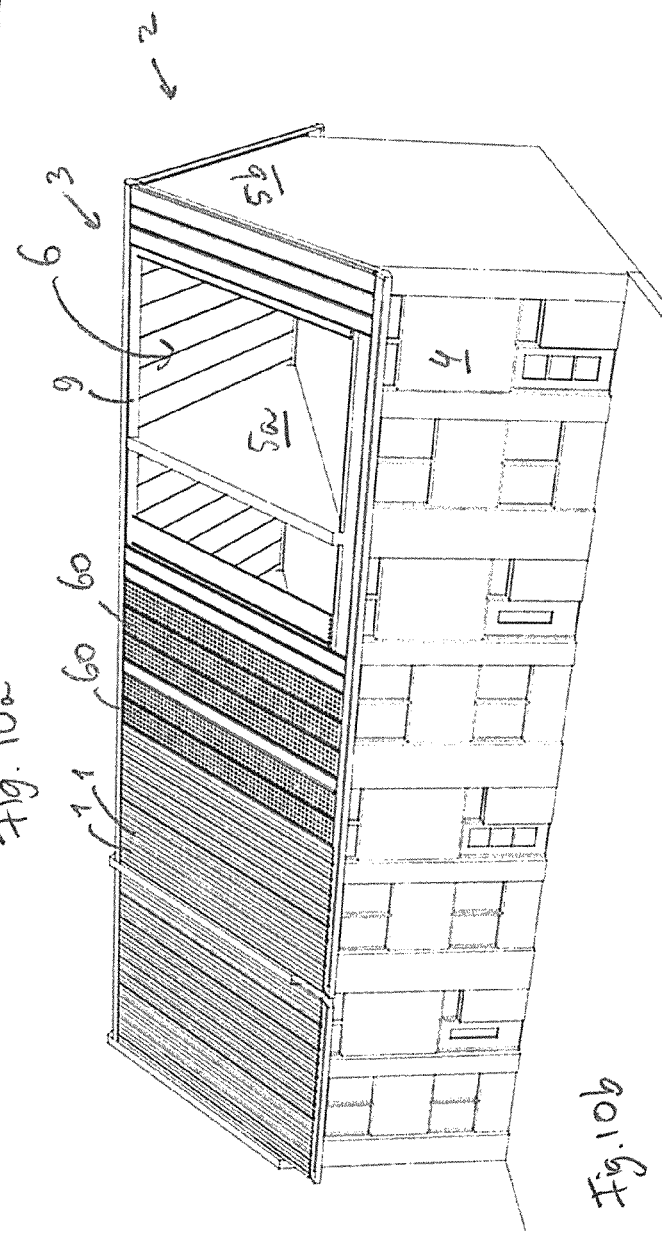

FIG. 10b shows in three-dimensional view a third embodiment of a roof according to the invention, comprising roof forming elements according to the first embodiment.

FIG. 1 shows a roof forming element 1 in exploded view. FIG. 5 shows a roof forming element 100. The roof forming elements 1, 100 and also other embodiments of roof forming elements described in the remainder of this description, are intended to be used for forming a roof of a building with a plurality of such elements. Said plurality of roof forming elements close an opening of the building of which the roof forms part. See FIGS. 10a and 10b for examples of a roof 3, 103 according to the invention, during the construction process of the roof. At the left side of FIGS. 10a, 10b a completed roof according to the invention, of a further building, is shown. The opening 6 of a building 2, at least in the examples of FIGS. 10a and 10b, is defined by a front wall 4 and a ridge beam 9, and by two opposite side walls 5a and 5b. The roof 3, 103 is a pitched roof, extending from the front wall 4, or at least from a lower extremity, to a ridge 9, or at least a higher extremity, being supported by said walls 5a, 5b forming a support structure for the roof 3, 103. The opening 6 is free from any support elements such as rafters and purlins. In an embodiment, the opening may have one or more purlins, for the purpose of forming a connection between the side walls.

If in the below description a number is given the addition 'this is only done for the purpose of a clear description of the invention as to the mutual connection of parts. The parts, for example 100, 100', are actually identical to each other.

Each of the roof forming elements comprises an elongate integral extruded combination 10 of a roof plate 11 and a beam 12. The roof plate 11 has a top plate 14 and a bottom plate 16 parallel to the top plate 14. See also FIG. 3. The roof plate 11 further has an intermediate plate 20 between the top plate 14 and the bottom plate 16, wherein the intermediate plate 20 is integrally interconnected to the top plate 14 as well as to the bottom plate 16 via a plurality of ribs 21 and 22 respectively, extending in length direction 8, i.e. extrusion direction of the roof plate 11.

The beam 12 extends in the length direction of the roof plate 11 and is located at a first longitudinal side 24 of the roof plate 11. It protrudes downwards from the bottom plate 16 of the roof plate, having a height h of 15 cm., at least in the present example. The width w of the roof plate 11 is 70 cm., at least in the present example. The ratio of height h:width w depends on the requirements of a specific roof to be formed using said roof forming element 1.

A second longitudinal side 26 of the roof plate 11 is free from such a beam protruding downwards from the bottom plate. As shown in FIGS. 1 and 3 in particular, the integral combination 10 of the roof plate 11 and the beam 12 has an L-shaped cross-section. The roof forming element has a length l but may, in dependence of the relevant dimension of a building opening to be spanned, longer or shorter.

The first longitudinal side 24 is provided with a groove 30 facing upwards, in the length direction. The second longitudinal side 26 has a rib 32 facing downwards, also in the length direction. The groove 30 and rib 32 are configured such that the rib 32 of a further roof forming element, being the same as the roof forming element 1, can be received in the groove 30 of the roof forming element 1, such that the roof forming element 1 supports said further element at that location. This means that the beam 12 of the roof forming element 1 also supports the roof plate of said further roof forming element. The roof forming element 1, more specifically said rib 32 and groove 30, is configured such that in coupled condition to a further, neighbouring roof forming element as described, the respective roof plates of said roof forming element 1 and said further roof forming elements are flush with respect to each other. See also FIGS. 3 and 4. Said groove 30 and rib 32 are part of coupling means for coupling the roof forming element to a further, neighbouring roof forming element.

The roof forming element 1 also has a cover 40 for at least substantially completely covering the top plate 14 at a distance therefrom, so as to define an interior space 44 between the cover 40 and the top plate 14 closed from external influences. The cover 40 extends over the entire width of the roof plate 11 and over the length l of the roof plate 11. The cover 40 is corrugated and closes the interior space 44. The cover 40 protects the interior space 44 from external influences, such as precipitation, at the longitudinal sides of the roof forming element 1, wherein the roof forming element 1 may comprise a closing element (not shown) at both its end faces seen in the length direction, extending between the roof plate and the cover, for sealing the interior space of the roof forming element at the respective end face. At the top end face of the roof forming element, at least when used for forming a pitched roof, may also be closed by a ridge beam functioning as closing element.

The cover has a wall portion 46 at a first longitudinal side 47. The wall portion 46 is received in a groove 49 at the second longitudinal side 26 of the roof forming element 1' disposed left from the element 1 the element 1, see FIG. 4. Alternatively, the wall portion 46 may be received in a groove 49a of an end piece 13 in case element 1 is the most left element in a row of such elements, see FIG. 3. In coupled, i.e. interconnected condition of two or more roof forming elements 1, as shown in FIGS. 2 and 4, the wall portion 46 of the cover 40 of a first one of the roof forming elements 1' supports the second longitudinal side 48 of the cover 40 of a further, neighbouring one 1 of the roof forming elements 1, 1'. Said second longitudinal side 48 overlaps the first longitudinal side 47 of the neighbouring cover 40. This way, a connection between said two adjacent elements 1, 1' is not only provided by the above described groove 30 and rib 32 but also by the wall 46 and side 48 of covers 40 of the adjacent elements 1, 1'. In order to clarify the invention, FIGS. 3 and 4 also show and end piece 15 at the second longitudinal side 26 of the most right element 1 in a row of such elements. The end piece 15 supports the second longitudinal side 48 of the cover of element 1. Also shown is an end beam 17, supporting the second longitudinal side of the element 1.

The roof plate 11 of the roof forming element 1 has a rib 50 at the first longitudinal side 24 of the roof plate 11, on top of the top plate 14. The roof plate also has a flange element 52 at the second longitudinal side of the roof plate 11, which is arranged to overlap, or, hook over, the rib 50 of a further, neighbouring roof forming element coupled to the roof forming element 1.

The integral combination 10 of the roof plate 11 and the beam 12 is at least substantially made of glass fibre reinforced polypropylene, preferably PP-LGF.

The roof forming element 1 also comprises a photovoltaic element 60 in its interior space 44. The cover 40 is light transparent to such an extent that in use electrical power can be generated by the photovoltaic element 60 due to incident sunlight. The photovoltaic element 60 covers about the entire surface of the roof plate 11. Alternatively, part of said surface may be covered with a photovoltaic element. When in use, some or all of the plurality of roof forming elements forming the roof may not have a photovoltaic element. The amount of photovoltaic elements in the plurality of roof forming elements may be chosen based on for example the desired total combined amount of electrical energy to be generated by the photovoltaic elements.

The roof forming elements 1 are configured to extend in one piece from the lower extremity to the higher extremity of an opening of the building in the absence of any other support structure in the opening. The beams 12 provide the required bending stiffness of the roof forming elements 1. The plurality of roof forming elements 1 are coupled to each other. The roof also comprises an additional roof element having the roof plate and the cover but being free from a beam at its first longitudinal side, which additional roof element is coupled to one of the outer ones of the mutually coupled roof forming elements at the first longitudinal side of that outer roof forming element, wherein the opening is closed entirely by the additional roof element and the plurality of roof forming elements.

A roof formed from a plurality of elements 1 may comprise a plurality of ceiling plates 80, each covering the space between two neighbouring beams 12 of two respective neighbouring roof forming elements 1, being connected to a free end of said beams, preferably by means of a snap/lock connection. The ceiling plates are also extruded, at least in the present example. As a result, a ceiling is formed for an interior space of the building underneath the roof. Optionally, insulation material 81 may be provided in said space between the ceiling panel 80 and the roof plate 11.

In the example according to FIG. 10b, showing a roof 3 during assembly, the opening 6 is closed by a plurality of interconnected roof forming elements 1 each extending in vertical direction and spanning the opening 6 between the front wall 4, or at least the gutter, and the ridge 9. The elements 1 are partly shown.

FIG. 5 shows a roof forming element 100 as an alternative embodiment of a roof forming element according to the invention. The roof forming element 100 is identical to the roof forming element 1, except for the cover 140 and for the end piece 115. Roof forming element 100 has a cover 140 also having a roof tile pattern, but now in width direction of the roof forming element 100. This means that a plurality of such elements 100 are to be provided in the building opening such that they extend in a horizontal direction. The end piece 115 is designed to follow the interior contour of the cover 140. In the example according to FIG. 10a, showing a roof 103 during assembly, the opening 6 is closed by a plurality of interconnected roof forming elements 100 each extending in horizontal direction and spanning the opening 6 between the side walls 5a, 5b.

FIG. 7 shows two roof forming elements 200, 200', interconnected, which roof forming elements 200 are an alternative embodiment of roof forming elements according to the invention. The roof forming element 200, 200' is identical to the roof forming element 1, 100, except for the cover. Roof forming element 200, 200' has a cover 240 in the form of a glass plate being placed on top of the roof plate 11 such that it is at a distance in the range of about 1 mm. to about 5 cm. from the top plate 14. It defines an interior space 44 between the top plate 14 and the glass plate 240 in which interior space a photovoltaic element 60 is provided. At the first longitudinal side, the cover 240 is overlapped by the flange 52 element of a further, neighbouring roof forming element, as shown in FIG. 5. Optionally, the above mentioned groove 49 may be closed by a closing strip, or may be absent at all.

FIG. 8 and FIG. 9 show a part of an industrial roof 102 comprising a plurality of roof forming elements 200. The roof has a plurality of mutually identical, spaced apart support beams 190, made of a polymer such as polycarbonate. At least in the present example, the support beams are transparent to such an extent that daylight can pass trough the support beams to the interior of the building. The beams 190 are extruded and have a flat bottom portion 193, a first wall part 191 at the one longitudinal side and the second wall part 192 opposite the first wall part 191 at the other longitudinal side of the bottom portion 193. The first wall part 191 is of greater height and supports the beam 12 of a roof forming element. The second wall part 192 of a neighbouring support beam 190, less high than the first wall part 191, supports that same roof forming element 200 at its second longitudinal side 26. As a result, the roof plate 11 of the roof forming element 200 is oriented under an angle with respect to the horizontal, or, with respect to the bottom plate 193 of the support beam 190. The beams 190 as well as the roof forming elements 200 preferably extend over the entire opening of the building covered by the roof 102. Of course elements 100 may be used alternatively to or in combination with elements 200.

The invention claimed is:

1. A building having a roof, which roof closes an opening of the building, wherein the roof is at least partly formed by a plurality of roof forming elements which each close a part of said opening, wherein the plurality of roof forming elements is supported by a support structure of the building, which support structure surrounds the opening,
each of the plurality of roof forming elements comprising
an elongate polymer roof plate having a top plate and a bottom plate parallel to the top plate, which top and bottom plate are integrally interconnected via a plurality of ribs extending in a length direction of the roof plate,
a beam which is manufactured as one integral part together with the roof plate, wherein the beam extends in the length direction of the roof plate, is located at a first longitudinal side of the roof plate, and protrudes downwards from the bottom plate of the roof plate, wherein the other, second longitudinal side is free from a second beam protruding downwards from the bottom plate, so that the integral combination of the roof plate and the beam has an L-shaped cross-section,
a cover for at least substantially completely covering the top plate at a distance therefrom, so as to define an interior space between the cover and the top plate, wherein the cover comprises at least one cover element which extends over the entire width of the roof plate and over at least part of the length of the roof plate, and
coupling means for coupling a first one of the plurality of roof forming elements to a second one of the plurality of roof forming elements, the second roof forming element neighbouring the first roof forming element,
wherein a second longitudinal side of the first roof forming element is supported by a first longitudinal side of the second roof forming element, so that the beam of the second roof forming element also supports the roof plate of the first roof forming element, and so that the first roof forming element and second roof forming element are flush with respect to each other, and wherein the respective roof plates of the first and second roof forming elements are flush with respect to each other,
wherein a second longitudinal side of a third roof forming element of the plurality of roof forming elements is supported by a first longitudinal side of the first roof forming element, the third roof forming element neighbouring the first roof forming element, the first longitudinal side of the first roof forming element being opposite the second longitudinal side of the first roof forming element, so that the beam of the first roof forming element also supports the roof plate of the third roof forming element, and so that the respective roof plates of the first roof forming element and the third roof forming element are flush with respect to each other, and
wherein the plurality of roof forming elements comprises a photovoltaic element in its interior space.

2. The building according to claim 1, wherein the ratio between the height of the beam and the width of the first roof plate element is in the range of 1:15 to 1:1.

3. The building according to claim 2, wherein the ratio between the height of the beam and the width of first roof plate element is in the range of 1:8 to 1:3.

4. The building according to claim 1, wherein the coupling means couple the second longitudinal side of the first roof forming element to the first longitudinal side of the second roof forming element.

5. The building according to claim 4, wherein the roof plate of the first roof forming element has a rib at the first longitudinal side of the roof plate of the first roof forming element, on top of the top plate of the roof plate of the first roof forming element, and has a flange element at the second longitudinal side of the roof plate of the first roof forming element, which is arranged to overlap a rib of the second roof forming element connected to the first roof forming element.

6. The building according to claim 1, wherein the roof plate of the first roof forming element comprises an intermediate plate between the top plate and the bottom plate, wherein the intermediate plate is integrally interconnected to the top plate as well as to the bottom plate via a plurality of ribs extending in length direction of the roof plate of the first roof forming element.

7. The building according to claim 1, wherein the cover seals the interior space from the outside at the longitudinal sides of the first roof forming element, wherein the first roof forming element comprises a respective closing element at both its end faces seen in the length direction, extending between the roof plate of the first roof forming element and the cover, for sealing the interior space of the first roof forming element at the respective end face.

8. The building according to claim 1, wherein the integral combination of the roof plate of the first roof forming element and the beam is at least substantially made of a polymer.

9. The building according to claim 8, wherein the integral combination of the roof plate of the first roof forming element and the beam is at least substantially made of a glass fibre reinforced polypropylene.

10. The building according to claim 1, wherein the cover is light transparent to such an extent that in use electrical power is generated by the photovoltaic element due to incident sunlight.

11. The building according to claim 1, further comprising a plurality of ceiling plates, wherein each of the ceiling plates is connected to a free end of the beam of at least two neighbouring roof forming elements, so as to form a ceiling for an interior space of the building underneath the roof.

12. The building according to claim 1, wherein each of the plurality of roof forming elements has a length which is about equal to a length of the roof and each have a width which is a part of a width of the roof, wherein the plurality of roof forming elements are interconnected such that they close the entire opening in the building.

13. The building according to claim 1, wherein each of the plurality of roof forming elements has a length which is about equal to a length of the roof and each have a width which is a part of a width of the roof, wherein the plurality of roof forming elements are interconnected, wherein the roof also comprises a further roof forming element having the roof plate of the first roof forming element and the cover but is free from a beam at its first longitudinal side, which further roof forming element is interconnected to one of the outer ones of the interconnected roof forming elements at the first longitudinal side of that outer roof forming element, wherein the opening is closed entirely by the further roof forming element and the plurality of roof forming elements.

14. The building according to claim 1, wherein the roof is a pitched roof, wherein the opening closed by the roof is bounded by a ridge and a building wall, which define the length of the roof, and by further opposite building walls, which define a width of the roof.

15. The building according to claim 1, wherein the cover of that at least one roof forming element is light transparent to such an extent that in use electrical power is generated by the photovoltaic element due to incident sunlight.

16. The building according to claim 1, wherein the elongate polymer roof plate of the first roof forming element is an extruded, elongate polymer roof plate of the first roof forming element; and wherein the beam is an extruded beam integral with the extruded, elongate polymer roof plate of the first roof forming element.

17. A building having a roof, which roof closes an opening of the building, wherein the roof is at least partly formed by a plurality of roof forming elements which each close a part of said opening, wherein the plurality of roof forming elements is supported by a support structure of the building, which support structure surrounds the opening, each of the plurality of roof forming elements comprising
an elongate polymer roof plate having a top plate and a bottom plate parallel to the top plate, which top and bottom plate are integrally interconnected via a plurality of ribs extending in a length direction of the roof plate,
a beam which is manufactured as one integral part together with the roof plate, wherein the beam extends in the length direction of the roof plate, is located at a first longitudinal side of the roof plate, and protrudes downwards from the bottom plate of the roof plate, wherein the other, second longitudinal side is free from a second beam protruding downwards from the bottom plate, so that the integral combination of the roof plate and the beam has an L-shaped cross-section,
a cover for at least substantially completely covering the top plate at a distance therefrom, so as to define an interior space between the cover and the top plate, wherein the cover comprises at least one cover element which extends over the entire width of the roof plate and over at least part of the length of the roof plate, and
coupling means for coupling a first one of the plurality of roof forming elements to a second one of the plurality of roof forming elements, the second roof forming element neighbouring the first roof forming element,
wherein a second longitudinal side of the first roof forming element is supported by a first longitudinal side of the second roof forming element, so that the beam of the second roof forming element also supports the roof plate of the first roof forming element, and so that the first roof forming element and second roof forming element are flush with respect to each other, and wherein the respective roof plates of the first and second roof forming elements are flush with respect to each other;
wherein a second longitudinal side of a third roof forming element of the plurality of roof forming elements is supported by a first longitudinal side of the first roof forming element, the third roof forming element neighbouring the first roof forming element, the first longitudinal side of the first roof forming element being opposite the second longitudinal side of the first roof forming element, so that the beam of the first roof forming element also supports the roof plate of the third roof forming element, and so that the respective roof plates of the first roof forming element and the third roof forming element are flush with respect to each other;
wherein the integral combination of the roof plate and the beam is at least substantially made of a polymer;
wherein the ratio between the height of the beam and the width of roof plate element is in the range of 1:15 to 1:1; and
wherein the plurality of roof forming elements comprises a photovoltaic element in its interior space.

* * * * *